US007107957B2

(12) United States Patent
Denz et al.

(10) Patent No.: US 7,107,957 B2
(45) Date of Patent: Sep. 19, 2006

(54) PROTECTED CONTROL APPARATUS

(75) Inventors: Helmut Denz, Stuttgart (DE); Karsten Kroepke, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 11/018,699

(22) Filed: Dec. 20, 2004

(65) Prior Publication Data

US 2005/0145209 A1 Jul. 7, 2005

(30) Foreign Application Priority Data

Dec. 20, 2003 (DE) ................................ 103 60 199

(51) Int. Cl.
*F02N 11/08* (2006.01)
*H02H 3/00* (2006.01)
*H01H 89/00* (2006.01)
*H01H 7/00* (2006.01)

(52) U.S. Cl. ...................... 123/179.3; 361/29; 307/141

(58) Field of Classification Search ............ 123/173.3, 123/198.03; 361/29; 307/141
See application file for complete search history.

(56) References Cited

U.S. PATENT DOCUMENTS 3,960,121 A * 6/1976 Backus .......................... 123/3
4,898,132 A * 2/1990 Kanno ..................... 123/179.3
5,574,320 A * 11/1996 Shirai et al. ................ 307/141

FOREIGN PATENT DOCUMENTS

DE 197 20 191 4/1998

* cited by examiner

*Primary Examiner*—Stephen K. Cronln
*Assistant Examiner*—Arnold Castro
(74) *Attorney, Agent, or Firm*—Kenyon & Kenyon LLP

(57) ABSTRACT

A control apparatus for protected switching of a load encompasses at least two switch units in series with a load, to permit delivery of energy to a load when each switch unit is switched on and to block it when at least one of the switch units is shut off; an electronic control system for triggering each switch unit via a first switching path and second switching paths, and for monitoring its state; a delay element on the first switching path, such that each switch unit can be shut off both by way of a shutoff signal conveyed via the first switching path and by way of a shutoff signal conveyed via the second switching path; and in a state in which one of the switch units is shut off and the other is switched on, the electronic control system ascertains a malfunction of the first switching path if, after output of a shutoff signal on the first switching path, the other switch unit does not shut off within a predefined time window.

8 Claims, 1 Drawing Sheet

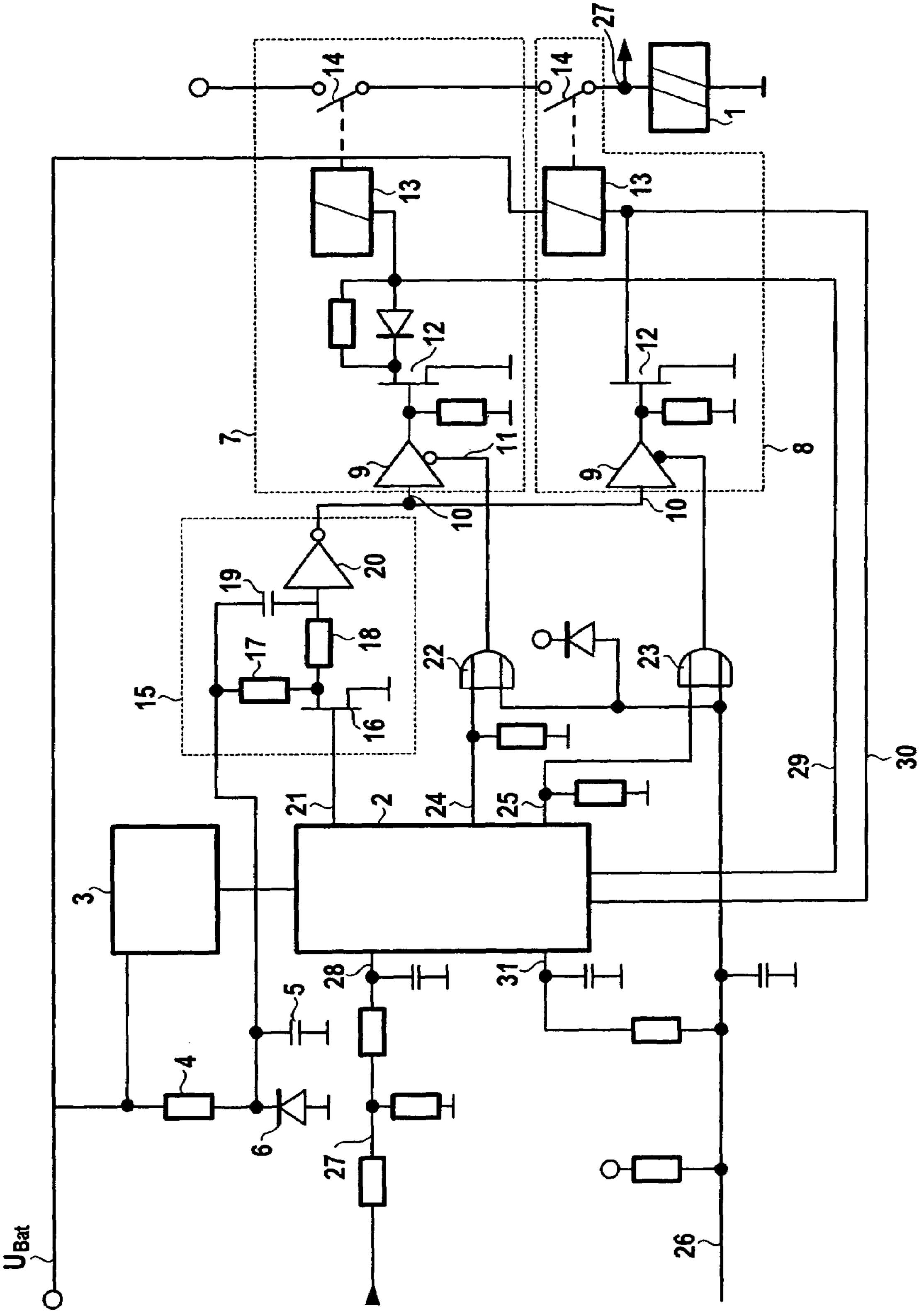
U_Bat
1
2
3
4
5
6
7
8
9
10
11
12
13
14
15
16
17
18
19
20
21
22
23
24
25
26
27
28
29
30
31

PROTECTED CONTROL APPARATUS

FIELD OF THE INVENTION

The present invention relates to an electronic control apparatus for protected switching of a load.

BACKGROUND INFORMATION

A control apparatus of this kind for motor vehicle applications is described in German Patent No. 197 20 191. This control apparatus encompasses a switch unit in the form of a relay that is connectable in series with a load, for example a motor vehicle starter, a windshield wiper, etc., in order to permit delivery of energy to the load when the switch unit is switched on, and to block it when it is shut off; an electronic control system in the form of a microcontroller, for triggering the switch unit; and a delay element that is disposed in a switching path between an output terminal of the electronic control system and an input terminal of the switch unit.

During the process of starting a motor vehicle's engine, voltage dips occur in the vehicle voltage system that can make an electronic control system temporarily inoperable or, if the electronic control system is a microprocessor or microcontroller, cause it to reset. This can cause incorrect control of a load that is being controlled by way of the electronic control system. This is particularly troublesome if the load is the starter motor of a motor vehicle, since a voltage dip of this kind during the engine starting operation causes the starter motor to shut off, the starting operation is thereby terminated, and it is not possible to start the vehicle.

Although it would be possible in principle to buffer the power supply of the electronic control system in order to prevent it from entering into an undefined state during starting, a large and correspondingly expensive capacitor is necessary for the purpose, which is why it is proposed in the aforesaid document to buffer not the power supply of the electronic control system, but instead the status of the input terminal of the switch unit, by inserting the aforementioned delay element between that terminal and the output terminal of the electronic control system.

While this delay element allows short-duration level changes to be intercepted at the output terminal of the electronic control system, it also delays the switch unit's reaction to a switch-on or shutoff signal deliberately supplied by the electronic control system.

SUMMARY OF THE INVENTION

The present invention creates a control apparatus for protected switching of a load that on the one hand prevents switching reactions in the event of a short-term fluctuation in supply voltage, but on the other hand prevents a delayed reaction by the load to an intentional switching signal.

A control apparatus that, by redundancy, achieves an elevated level of reliability when switching the load is also created.

The control apparatus according to the present invention is furthermore capable of automatically detecting internal malfunctions and thus preventing incorrect control of the load.

Protection via redundancy is achieved by the fact that at least two of the switch units connectable in series with a load are provided. To shut off the load, it is sufficient to shut off a single switch unit; but if one of the switch units becomes jammed in the switched-on state, at least one further one is available so as thereby to shut off the load.

Further redundancy protection results from the use of two switching paths between the electronic control system and each switch unit, each of which paths, when the control apparatus is functioning correctly, is individually capable of shutting off a connected switch unit.

In order to guarantee the long-term effectiveness of the redundancy protection, it is necessary to sense faults that occur in the redundant switch units or switching paths, even if one intact switch unit and one switching path is still present that allows the load to be shut off. For that purpose, provision is made according to the present invention that in a state in which one of the switch units is shut off and the other switched on, the electronic control system performs a test of the first switching path by outputting a shutoff signal at its first output terminal, and ascertains a malfunction of the first switching path if the other switch unit does not shut off within a predetermined time window, selected as a function of a delay time of the delay circuit, after output of the shutoff signal.

A malfunction of the first shutoff path can be constituted by the fact that the other switch unit shuts off after output of the shutoff signal but before the beginning of the predetermined time window. In this case the delay effect of the delay circuit is disrupted. Although such a malfunction can result in further problems, it does not yet represent a safety risk of itself, since shutoff of the load is guaranteed in any case if a shutoff signal is sent to that first output terminal. A fault in which the other switch unit has not yet shut off even after the time window ends is more serious, since the reliability of the shutoff operation is thereby called into question. In order at least to warn a user about such a fault, a device should be provided for generating a warning signal in audible or visible form.

The check of the first shutoff path described above can usefully be performed when the load is shut off. For that purpose, the electronic control system preferably first sends a shutoff signal to the one switch unit via the second switching path, and performs the check of the first switching path when the one switch unit has transitioned into the shut-off state.

If the one switch unit does not transition into the shut-off state upon transmission of the shutoff signal on the second switching path, advantageously a warning signal should once again be generated.

In order to check the functionality of both switching paths for both switch units with the same frequency of occurrence, the electronic control system advantageously shuts off the two switch units in alternating sequence upon shutoff of the load. In other words, in a first shutoff operation the electronic control system firstly shuts off a first switch unit on the second switching path so as thereby to check its functionality, and then shuts off the second switch unit via the first switching path; and at the subsequent shutoff operation it first shuts off the second switch unit via the second switching path and then the first switch unit via the first switching path.

In order to ensure emergency shutoff of the load regardless of a shutoff signal supplied by the electronic control system, a logic gate through which an external shutoff signal can be applied to the first or the second switch unit is preferably inserted into each second switching path. If the load is a starter motor of a vehicle with automatic transmission, this external switching signal can be derived, for example, from a driving mode selector switch, in order to shut off the starter motor as soon as the selector switch is shifted from a Park or Neutral mode into a forward or reverse driving mode.

With regard to interference stability in the event of voltage dips, it is useful for the shutoff signal at the first output signal of the electronic control system to correspond to a ground level, and for the shutoff signal at its second output terminal to correspond to a level other than ground. The reason is that the level of the second output terminal is then at ground while the load is intended to be in operation, and that level does not change in the event of a breakdown in supply voltage; whereas the level other than ground at the first output terminal can break down, but this has no effect because of the action of the delay circuit, provided the voltage drop is only temporary.

BRIEF DESCRIPTION OF THE DRAWING

The FIGURE is a circuit diagram of a control apparatus according to the present invention.

DETAILED DESCRIPTION

The FIGURE is a schematic circuit diagram of a control apparatus according to the present invention and a load controlled by it, here a starter motor 1 for a motor vehicle. The control apparatus is constructed around a microprocessor or microcontroller 2 that can serve as an electronic control system not only for switching on and shutting off starter motor 1, but additionally for many other functions of the motor vehicle. Microcontroller 2 receives its operating voltage from a DC voltage converter 3 that is powered from the vehicle's electrical system ($U_{Bat}$).

Microcontroller 2 controls two switch units 7, 8 that, connected in series, control the supply of current to starter motor 1. Each switch unit 7, 8 encompasses a driver amplifier 9 having a signal input that constitutes a first input terminal 10 of the switch unit, and an enable input that constitutes a second input terminal 11. Each driver amplifier 9 is activated by a low level or ground level at its enable input, and deactivated by a high level. Each driver amplifier 9 drives a power transistor 12 that controls the current flow through a coil 13 of a relay. The relay's armature, movable in coil 13, controls the position of a switch 14 in the supply current circuit of starter motor 1.

A first switching path extends from a first output terminal 21 of microcontroller 2 via a delay circuit 15 to first input terminals 10, connected in parallel, of switch units 7, 8. Delay circuit 15 is constructed substantially from a transistor 16, resistors 17, 18, a capacitor 19, and a Schmitt trigger 20. The gate of transistor 16 constitutes the input of the delay circuit. Its drain is connected to ground, and the source is connected on the one hand via resistor 17 to a supply potential, and on the other hand via resistor 18 to the input of Schmitt trigger 20. Capacitor 19 is located between the supply potential and the input of Schmitt trigger 20. The supply potential is derived from battery voltage $U_{Bat}$ of the vehicle's power system via a resistor 4, a Zener diode 6 for intercepting voltage spikes, and a smoothing capacitor. When low potential is present at the input of delay circuit 15, transistor 16 blocks, there is no voltage drop at resistors 17, 18, capacitor 19 is discharged, and a high potential is present at the input of Schmitt trigger 20. The delay circuit thus delivers a low level.

When the input signal of the delay circuit switches to high potential, transistor 16 becomes conductive and its source potential assumes a low value. While capacitor 19 begins to charge through resistor 18, high potential is at first still present at the input of the Schmitt trigger, but it decreases with a time constant dependent on the value of resistor 18, so that the Schmitt trigger switches over after a short delay. The output signal of delay circuit 15 then transitions to positive potential.

When the input signal of the delay circuit returns to low potential and transistor 16 once again blocks, capacitor 19 holds the input of Schmitt trigger 20 at low potential until it has discharged through the series circuit of resistors 17, 18. The time constant for discharging is necessarily longer than for charging; in practice, the value of resistor 17 is selected to be substantially greater than that of resistor 18, so that the reaction delay of Schmitt trigger 20 at the changeover to a high potential at the input of delay circuit 15 is negligible.

If battery voltage $U_{Bat}$ breaks down as the vehicle is being started, the supply potential of delay circuit 15 is maintained, with the aid of the smoothing capacitor, for at least the length of time needed by the microcontroller to resume its normal operation after a reset triggered by the voltage breakdown.

Two second switching paths extend from a second output terminal 24, 25 of microcontroller 2 via an OR gate 22, 23 to second input terminals 111 of switch units 7, 8. Connected to second inputs of OR gates 24, 25 is a so-called interlock line 26 whose level reflects the position of an operating mode selector lever (not depicted) of the vehicle: interlock line 26 is at ground level when the selector lever is in a Park or Neutral position, and a positive level when it is in a forward or reverse driving position.

When the microcontroller is delivering a high logic level at its first output terminal 21, transistor 16 is open and the input of Schmitt trigger 20 is grounded. Since Schmitt trigger 20 has an inverting function, it supplies a positive signal to first input terminals 10 of switch units 7, 8. When second output terminals 24, 25 and interlock line 26 are simultaneously grounded, driver amplifiers 9 of switch units 7, 8 are enabled and switch their power transistors 12 on. Current can thus flow through coils 13 of the two relays, switches 14 close, and starter motor 1 is supplied with current.

In order to shut starter motor 1 off again and simultaneously to check the functionality of the control apparatus, microcontroller 2 firstly outputs a shutoff signal in the form of a high level at one of its second output terminals 24, 25.

Let us first consider the case in which this shutoff signal is outputted at output terminal 24. It propagates through OR gate 22 to second input terminal 11 of switch unit 7 and blocks the latter's driver amplifier 9, so that power transistor 12 transitions into the blocked state and switch 14 of the (now currentless) relay is deenergized. Starter motor 1 is thereby shut off.

A malfunction of the control apparatus could be constituted by the fact that the relay of switch unit 7 jams, and its switch 14 is not deenergized even in the currentless state. In this situation supply voltage from the vehicle's system continues to be present at an input connector 27 of starter motor 1. If that is the case, it is detected by microprocessor 2 by way of a potential, derived from input connector 27, at one of its monitoring inputs 28. Microcontroller 2 records the fault in a file that is kept in a memory module (not depicted in the FIGURE). This memory module can be read by service personnel using suitable equipment, so the malfunction can be quickly recognized and eliminated. At the same time, microcontroller 2 triggers a warning device, e.g. in the form of a light on the vehicle's instrument panel, which informs the driver that a fault exists in the vehicle's electrical system and a service visit is necessary; and it sends a shutoff signal, in the form of a high level, on the second switching path to switch unit 8 in order to shut off load 1.

Another possible fault is that power transistor 12 is kept locked in the conductive state by the current flowing through it, even when its gate potential goes to ground. This fault is sensed by microprocessor 2 with the aid of a monitoring line 29 that reports the potential at an output connector of coil 13 back to microcontroller 2. Here as well, the fault is noted in the file and a warning is outputted to the driver.

If the relay of first switch unit 7 has deenergized correctly, the second switching path of switch unit 7 is considered intact and microprocessor 2 generates a shutoff signal in the form of a ground level at its first output terminal 21. Transistor 16 blocks and, after a delay time interval defined by the capacitance of capacitor 19 and the resistance of resistor 18, the output of Schmitt trigger 20 goes to ground. As a result, the gate potential of power transistor 12 in second switch unit 8 also goes to ground, transistor 12 blocks, and the relay is deenergized. This has no further influence on the functioning of starter motor 1, since the latter is already shut off. The potential at a point between coil 13 and power transistor 12 of second switch unit 8 is reported back to microcontroller 2 via a second monitoring line 30. If that potential goes to ground within a predetermined time window after output of the shutoff signal at output terminal 21, microcontroller 2 recognizes that the first shutoff path is intact. If monitoring line 30 goes to ground before the time window begins, the delay effect of delay circuit 15 then no longer exists, or at least no longer exists to the intended extent. Microcontroller 2 enters this malfunction into the file as well, but does not yet necessarily generate a warning for the driver, since it is still possible for starter motor 1 to shut off with the necessary dependability, i.e. operating reliability is not impaired.

If, however, monitoring line 30 has not yet gone to ground after expiration of the time window, microcontroller 2 recognizes a malfunction that impairs the reliability with which starter motor 1 can be shut off, or that can possibly even result in an unintentional activation of starter motor 1. In this case the warning signal is once again activated so that the fault is quickly eliminated.

The next time starter motor 1 is shut off, microcontroller 2 transposes the functions of the first and second switch units, i.e. it first shuts off second switch unit 8 by way of a positive shutoff signal outputted at second output terminal 25, so as thereby to check the functionality of the second shutoff path for second switch unit 8; and if that test proceeds successfully, it also shuts off first switch unit 7 by outputting a shutoff signal at first output terminal 21.

Interlock line 26 is connected to a switch on the vehicle's driving state selector lever; that switch supplies a ground level via interlock line 26 as long as the selector lever is in a Park or Neutral position, and supplies a positive level as soon as the selector lever is moved into a forward or reverse driving mode. That positive level, via OR gates 22, 23, reaches the two input terminals 11 of both switch units 7, 8 and causes them to shut off. If that shutoff takes place while microcontroller 2 is checking the functionality of the shutoff paths, the test must be discontinued because it is no longer yielding usable results. To detect this situation, one input terminal 31 of microprocessor 2 is connected to interlock line 26.

According to an additionally refined embodiment of the control apparatus, checking of the switching paths is completely discontinued only if the interruption by interlock line 26 takes place during testing of one of the two shutoff paths. If that testing has proceeded successfully, however, and the interruption takes place during checking of the first switching path, microcontroller 2 then continuously outputs a positive level at all three output terminals 21, 24, 25. Both switch units 7, 8 are thus held in the shut-off state. When microcontroller 2 senses that interlock line 26 is going back to ground, e.g. because the driver of the vehicle has moved the selector lever into the Park position shortly before shutting off the engine, it outputs a ground level on the second switching path that remains untested, thereby immediately switching on switch unit 7 or 8 connected thereto. Since the respective other switch unit remains shut off, starter motor 1 is not activated as a result. Microcontroller 2 then delivers a ground level to first output terminal 21 in order thereby to shut off the switched-on switch unit with the delays effected by delay circuit 15, and checks whether the shutoff time falls in the predetermined switching window.

What is claimed is:

1. A control apparatus for protected a switching of a load, comprising:

- a plurality of switch units connectable in series with the load in order to permit delivery of energy to the load when each switch unit is switched on, and to block delivery of energy to the load when the at least one of the switch units is shut off;
- an electronic control system for triggering each switch unit; and
- a delay element disposed on a first switching path between a first output terminal of the electronic control system and a first input terminal of each switch unit, wherein:
  - the electronic control system includes an arrangement for monitoring a state of each switch unit,
  - the electronic control system includes a second output terminal that is connected via a second switching path to a second input terminal of a respective one of the switch units,
  - the switch units can be shut off both by way of a shutoff signal applied to the first input terminal thereof and by way of the shutoff signal applied to the second input terminal thereof, and
  - the electronic control system is set up to perform, in a state in which one of the switch units is shut off and another one of the switch units is switched on, a test of the first switching path by outputting the shutoff signal at the first output terminal and ascertaining a malfunction of the first switching path if the other one of the switch units does not shut off within a predefined time window after output of the shutoff signal.

2. The control apparatus as recited in claim 1, wherein the electronic control system, in order to shut off the load, is set up firstly to send the shutoff signal to the one of the switch units via the second switching path, and to perform the test of the first switching path if the one switch unit has transitioned into the shut-off state.

3. The control apparatus as recited in claim 2, wherein the electronic control system is set up to ascertain a malfunction of the second switching path of the one of the switch units if the shutoff signal sent on the second switching path brings the one of the switch units into the shut-off state too quickly or not at all.

4. The control apparatus as recited in claim 2, wherein the electronic control system shuts off the one of the switch units and the other of the switch units respectively in a first sequence at a first shutoff of the load, and in an opposite second sequence at a subsequent second shutoff.

5. The control apparatus as recited in claim 1, wherein a logic gate for applying an external shutoff signal to the one of the switch units and the other of the switch units is disposed in each second switching path.

6. The control apparatus as recited in claim 1, wherein the shutoff signal at the first output terminal of the electronic control system corresponds to a ground level, and the shutoff signal at the second output terminal of the electronic control system corresponds to a level other than ground.

7. The control apparatus as recited in claim 1, further comprising:

a device for generating a warning signal, the device being activated at least when the other one of the switch units is still switched on after expiration of the predetermined time window.

8. The control apparatus as recited in claim 1, wherein the load includes a starter motor for an internal combustion engine.

* * * * *